(12) United States Patent
Chelaidite

(10) Patent No.: US 9,592,813 B2
(45) Date of Patent: Mar. 14, 2017

(54) ACTUATOR ASSEMBLY FOR A PARKING BRAKE SYSTEM

(71) Applicant: AKEBONO BRAKE INDUSTRY CO., LTD, Chuo-ku, Tokyo (JP)

(72) Inventor: Galus Chelaidite, South Lyon, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 14/750,488

(22) Filed: Jun. 25, 2015

(65) Prior Publication Data

US 2016/0375885 A1    Dec. 29, 2016

(51) Int. Cl.
*B60T 13/74*  (2006.01)
*B60T 11/04*  (2006.01)

(52) U.S. Cl.
CPC ........... *B60T 13/746* (2013.01); *B60T 11/046* (2013.01)

(58) Field of Classification Search
CPC .. F16D 51/50; F16D 2121/24; F16D 2125/60; F16D 2125/40; F16D 65/28; F16D 2121/26; F16D 2125/582; F16D 2129/10
USPC ........ 188/156, 162, 2 D, 71.9, 72.8
See application file for complete search history.

(56) References Cited

U.S. PATENT DOCUMENTS

| | | | |
|---|---|---|---|
| 5,180,038 A * | 1/1993 | Arnold | B60T 13/743 188/171 |
| 5,769,189 A | 6/1998 | Heibel et al. | |
| 6,244,394 B1 * | 6/2001 | Gutierrez | B60T 7/107 188/156 |
| 7,337,883 B2 * | 3/2008 | Geyer | B60T 7/107 188/156 |
| 7,648,006 B2 * | 1/2010 | Deutloff | B60T 7/107 188/156 |
| 8,607,938 B2 * | 12/2013 | Lee | B60T 11/046 188/162 |
| 8,662,263 B2 * | 3/2014 | Deutloff | 188/162 |
| 8,720,653 B2 * | 5/2014 | Han | B60T 7/107 188/156 |
| 9,182,021 B2 | 11/2015 | Muramatsu et al. | |
| 9,211,877 B2 * | 12/2015 | Deutloff | B60T 7/085 |
| 9,227,611 B2 | 1/2016 | Gilles | |
| 2005/0115774 A1 * | 6/2005 | Nieto Gil | B60T 13/746 188/2 D |
| 2007/0240950 A1 | 10/2007 | Deutloff et al. | |

(Continued)

FOREIGN PATENT DOCUMENTS

CN    105308364 A    2/2016
EP    2165899 B1    11/2015

(Continued)

*Primary Examiner* — Thomas J Williams
*Assistant Examiner* — Mariano Sy
(74) *Attorney, Agent, or Firm* — The Dobrusin Law Firm, P.C.

(57) ABSTRACT

Disclosed is an assembly that includes a spindle; a brake cable in communication with the spindle; and a spring in communication with the spindle. Movement of the spindle in a first direction causes the brake cable to move so that a clamping force is created. Movement of the spindle in a second direction causes the brake cable to move in a second direction so that the clamping force is released. Movement of the spindle in both the first direction and the second direction causes the spring to compress so that a controller can determine when the clamping force is created and released.

17 Claims, 2 Drawing Sheets

(56) References Cited

U.S. PATENT DOCUMENTS

| | | | |
|---|---|---|---|
| 2009/0205912 A1* | 8/2009 | Park | B60T 13/746 188/156 |
| 2009/0247364 A1 | 10/2009 | Sano et al. | |
| 2009/0260929 A1* | 10/2009 | Boyle | B60T 13/746 188/156 |
| 2010/0078274 A1 | 4/2010 | Jackson et al. | |
| 2010/0082213 A1 | 4/2010 | Taylor et al. | |
| 2013/0112022 A1 | 5/2013 | Shimizu | |
| 2013/0153349 A1 | 6/2013 | Akada et al. | |
| 2014/0027221 A1* | 1/2014 | Akada | F16D 51/50 188/325 |
| 2014/0041975 A1 | 2/2014 | Takewaki et al. | |
| 2014/0345989 A1 | 11/2014 | Oshio et al. | |
| 2015/0041261 A1 | 2/2015 | Masuda et al. | |
| 2015/0053513 A1 | 2/2015 | Yoon | |
| 2015/0184713 A1* | 7/2015 | Roos | B60T 7/085 188/158 |
| 2015/0246662 A1 | 9/2015 | Masuda et al. | |
| 2015/0321647 A1 | 11/2015 | Deutloff et al. | |
| 2015/0330465 A1 | 11/2015 | Shin | |
| 2015/0343905 A1 | 12/2015 | Knechtges | |
| 2015/0344013 A1 | 12/2015 | Knechtges et al. | |
| 2015/0344014 A1 | 12/2015 | Knechtges et al. | |
| 2015/0345580 A1 | 12/2015 | Jung | |
| 2015/0345581 A1 | 12/2015 | Shin et al. | |
| 2015/0345602 A1 | 12/2015 | Funada et al. | |
| 2016/0025171 A1 | 1/2016 | Choi | |
| 2016/0076631 A1 | 3/2016 | Funada | |
| 2016/0201745 A1 | 7/2016 | Zhang et al. | |

FOREIGN PATENT DOCUMENTS

| | | |
|---|---|---|
| EP | 2353952 B1 | 12/2015 |
| EP | 3006778 A1 | 4/2016 |
| JP | 2014231868 A | 12/2014 |
| WO | 2014192760 A1 | 12/2014 |
| WO | 2016/005867 A2 | 1/2016 |
| WO | 2016/064980 A1 | 4/2016 |

* cited by examiner

ACTUATOR ASSEMBLY FOR A PARKING BRAKE SYSTEM

FIELD

The present teachings relate to a parking brake system and more particularly to an actuator assembly for a parking brake system.

BACKGROUND

A drum brake system is a common type of brake system. Drum brakes generally include opposing brake shoes that are moved away from one another and into engagement with an inner surface of a brake drum to create an expansion force to slow or stop a moving vehicle. A drum-in-hat system is another type of brake system that combines a disc brake system and a drum brake system. The disc brake system includes opposing brake pads that are moved towards each other and into engagement with a brake rotor to create a clamping force to slow or stop a moving vehicle. In drum-in-hat systems, the drum brake system is used as a parking brake to create the expansion force necessary to maintain the vehicle in a stopped or parked position by moving brake shoes into engagement with an inner surface of the brake rotor (i.e., a drum portion).

Some parking brake systems use an actuator assembly to move the brake shoes into engagement with the brake drum and/or the drum portion of as brake rotor to create the expansion force during a parking brake apply. The actuator assembly is also used to move the brake shoes out of engagement with the brake drum and/or the drum portion of the brake rotor to release the expansion force. Some parking brake systems, actuator assemblies, or both use a position sensor to track brake shoe wear and to verify that the brake shoes return to a home position after the parking brake is released. To reduce cost and space, and to comply with updated recommendations, it may be desirable to provide as brake system that does not include as position sensor. That is, it may be desirable to have an actuator assembly that includes a mechanism or device other than a position sensor to monitor brake shoe wear and to verify that the brake shoes return to a home position after release of the parking brake. It may be attractive to have an actuator assembly for a parking brake system that can be easily incorporated into a conventional brake system, such as a drum brake system, a drum-in-hat brake system, or both. It would be desirable to provide an actuator assembly for as parking brake system that is reliable, can be mass-produced relatively inexpensively, that has a minimal number of parts, and is easy to operate.

An example of a parking brake system is disclosed in U.S. Patent Application Publication No. 2014/0345989, and an example of an actuator for a parking brake system is disclosed in U.S. Pat. No. 8,011,482 B2, both of which are expressly incorporated by reference herein for all purposes.

SUMMARY

The present teachings provide an actuator assembly for a parking brake system. The actuator assembly according to the teachings herein may be used with a parking brake system in any brake system, such as a drum brake system, a drum-in-hat brake system, or both. The actuator assembly includes a mechanism or device other than a position sensor to monitor brake shoe wear and the position of the brake shoes after the parking brake system is released. The actuator assembly of the present teachings herein can be easily incorporated into a parking brake system, a conventional brake system, such as a drum brake system, a drum-in-hat brake system, or a combination thereof. The actuator assembly of the present teachings is reliable, can be mass-produced relatively inexpensively, has a minimal number of parts, and is easy to operate.

The present teachings further provide an assembly that includes a spindle; a brake cable in communication with the spindle; and a spring in communication with the spindle. Movement of the spindle in as first direction causes the brake cable to move so that an expansion force is created. Movement of the spindle in a second direction causes the brake cable to move in a second direction so that the expansion force is released. Movement of the spindle in both the first direction and the second direction causes the spring to compress so that as controller can determine when the expansion force is created and released.

Further yet, the present teachings provide an assembly comprising a spindle, a motor, and brake cable. The motor is in communication with the spindle and causes the spindle to selectively move in a first direction or in a second direction. The brake cable is in communication with the spindle. The spring is compressed in response to movement of the spindle. The spring is located between a key plate and an end plate. Movement of the spindle in the first direction causes the brake cable to move in the first direction so that as parking brake force is created. Movement of the spindle in the second direction causes the brake cable to move in the second direction so that the parking brake force is released. When the spindle is moved in the first direction, the key plate and the end plate are both moved in the first direction, which then together compress the spring therebetween while the parking brake force is created. When the spindle is moved in the second direction, the key plate and the end plate are both moved in the second direction, and as the parking brake force is reduced, the compressed spring separates the key plate and the end plate back to their normal position until the parking brake is released. As the spindle continues to move in the second direction after the parking brake is released, the key plate contacts an internal stop, the gear nut, which, via the internal design of the mechanism, causes the key plate and the end plate to compress the spring therebetween. A controller can determine when the parking brake force is created and released by compression of the spring.

Still further yet, the present teachings provide an actuator assembly for a brake system, comprising a spindle, as motor, a brake cable, a spring and multiple cable stops or crimps. The motor is in communication with the spindle causing the spindle to selectively axially move in a first direction and in a second direction. The brake cable is connected the spindle and includes a first cable stop and a second cable stop. The spindle, key plate, spring, and end plate are all located between the first cable stop and the second cable stop. The first cable stop rests against the end plate while the second cable stop rests against a forward spindle end. The first cable stop and the second cable stop are crimped onto the cable is such a way that the spring is compressed between the key plate and the end plate. The spring may be compressed as necessary for the proper function of the actuator assembly. The spring is further compressed between a key plate and an end plate in response to movement of the spindle whether during a parking brake apply or during a parking brake release. When the spindle is moved in the first direction, the key plate pushes the spring and the end plate in the first direction against the second cable stop so that the second cable stop and therefore the brake cable move in the first direction. The spring is compressed between the key plate and the end plate as a clamping force is created. When the spindle is moved in the second direction, the spindle pushes the first cable stop thereby causing the second cable stop to push the end plate. The spring is compressed between the end plate and the key plate as the clamping force is released. A controller can determine when the clamping force is created and released by compression of the spring. The actuator assembly does not include a position sensor to determine when the clamping force is created and released.

DETAILED DESCRIPTION

Figure 1:
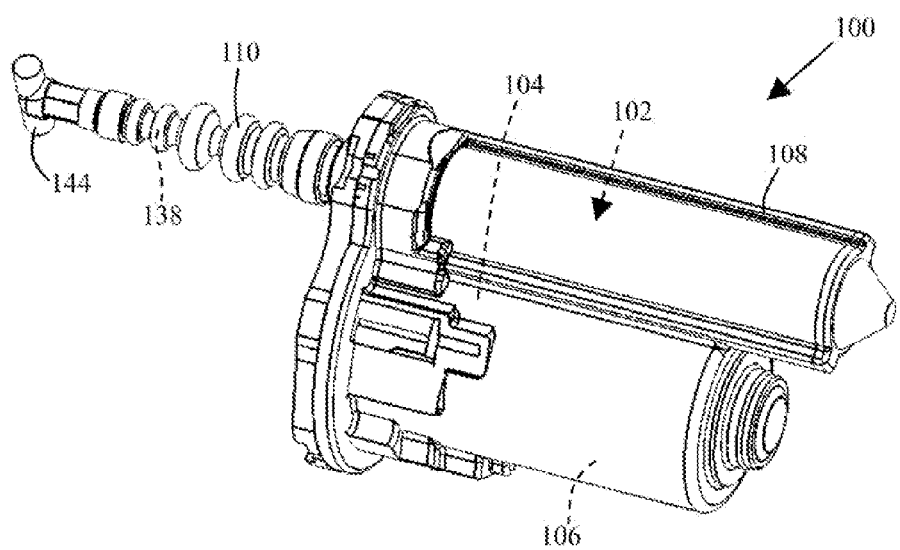
FIG. 1 illustrates a perspective view of the actuator assembly including a spindle assembly according to the teachings herein.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved parking brake system. More particularly, the description herein relates to improved components for a parking brake system; an improved actuator assembly for a parking brake system; improved components for an actuator assembly; or a combination thereof. The present teachings may be used with a brake system in any vehicle. For example, the teachings herein can be used in a car, truck, bus, train, airplane, all terrain vehicle, etc. The teachings herein can be used in non-vehicular applications. For example, the teachings herein may be applicable to brake systems used in various machines, such as a lathe, a winder for paper products or cloth, amusement park rides, wind turbines, or the like.

During a brake apply, the brake system may function to provide a force, such as a braking force. The braking force may be any force that, together with a brake shoe coefficient of friction, is sufficient to slow or prevent rotation of a brake drum, a brake rotor, or both; slow or prevent movement of a vehicle; or both. The brake system can be virtually any brake system. Preferably, the brake system is a drum brake system. More preferably, the brake system is a drum-in-hat brake system. The drum brake system may generally include a cylinder or piston that moves one or more brake shoes into engagement with an inner surface of a brake drum to create an expansion force to slow or stop a moving vehicle. The drum in-hat brake system may combine a disc brake system and a drum brake system. The disc brake system may include opposing brake pads that are moved towards each other and into engagement with a brake rotor to create a clamping force to slow or stop a moving vehicle. In drum-in-hat systems, the drum brake system may be used as a parking brake to create an expansion force for maintaining the vehicle in a stopped or parked position. The drum brake system may function by moving the brake shoes away from one another and into engagement with an inner surface of a brake rotor (i.e., an inner surface portion of the brake rotor, a brake drum portion, etc.). The brake system may be a pneumatic brake system, an electrical brake system, a hydraulic brake system, or a combination thereof. Preferably, at least a portion of the brake system is an electric system. More preferably, the brake system is at least partially hydraulic and the parking brake system that is at least partially electric.

During a parking brake apply, the parking brake system may function to provide an expansion force, such as a parking brake force. The parking brake force may be a force that, together with a brake shoe coefficient of friction, is sufficient to prevent rotation of a brake rotor or brake drum; prevents movement of a vehicle; maintains a vehicle in a stopped or parked position; or a combination thereof. The parking brake system may include a gear train that amplifies the torque from a motor housed inside an actuator assembly. The gear train may also transfer torque from the motor to the one or more spindle assemblies.

The brake drum may function to assist in creating an expansion force during a brake apply, a parking brake apply, or both. The brake drum may rotate with a wheel and/or axle of a vehicle when the vehicle is in motion. The brake drum may be an inner surface of a brake rotor, within a hat portion of a brake rotor, or both. When the brake system, the parking brake system, or both is applied, the friction material of the one or more brake shoes is pushed radially outward against an inner surface of the brake drum and/or an inner surface of the brake rotor to create the expansion force. Again, the expansion force may function to slows, stop, or prevent rotation of the wheel and axle, and thus slow, stop, or prevent movement of the vehicle.

When moved into contact with another member (e.g., the inner surface of the brake rotor, the brake drum, etc.), the one or more brake shoes may function to create an expansion three, which may be a braking force, a parking brake force, or both, one or more brake shoes may be generally curved or arcuate. The one or more brake shoes may include a pressure plate and friction material. The friction material may be moved or forced against the inner surface of the brake drum to create the expansion force, the braking force, the parking brake force, or a combination thereof. The pressure plate may be in communication with a moveable member so that during a brake apply, the moveable member moves the brake shoe against the inner surface of the brake drum to create the expansion force or braking force. The moveable member may also move the brake shoe away from the inner surface of the brake drum to release the expansion force, the brake force, the brake apply, or a combination thereof. The pressure plate may also be in communication with an actuator assembly, a parking brake lever, a link, a brake cable, or a combination thereof, so that during a parking brake apply, the actuator assembly moves the brake shoes against the inner surface of the brake drum to create the expansion force or parking brake force. The actuator assembly may also move the brake shoe away from the inner surface of the brake drum to release the expansion force, the parking brake force, or both.

The actuator assembly may function to move one or more brake shoes towards or away from the inner surface of the brake drum. That is, during a parking brake apply, the actuator assembly may move the one or more brake shoes towards and against the brake drum, the inner surface of the brake rotor, or both to create an expansion force, a parking brake force, or both. The actuator assembly may function to maintain the one or more brake shoes against the brake rotor, the brake drum, or both to maintain the expansion force, the parking brake force, or both. During release of the parking brake, the actuator assembly may move the one or more brake shoes away from, and out of engagement with, the brake rotor, the brake drum, or both in order to release the expansion force, the parking brake force, or both. The actuator assembly may move one or more brake shoes in unison, individually, or a combination of both. The actuator assembly may generally include a motor, a gear train, and a housing containing therein one or more of the components of the actuator assembly.

The motor may be any device or combination of devices that may function to generate or provide a force or torque for creating, releasing, and/or maintaining an expansion force, such as the parking brake force. The motor may include one or more suitable motors and/or one or more other suitable power supplies. For example, the one or more motors may include a DC motor, a series wound motor, a shunt wound motor, a compound wound motor, a separately exited motor, a servomotor, or a permanent magnet motor.

The gear train may be any device or combination of devices that may function to provide or transfer a force or torque from the motor to the spindle assembly to create, maintain, and/or release an expansion force. For example, the gear train may include one or more gears that are in communication with an output of the motor. The gear train may include a gearing assembly such as a differential assembly that splits power between two halves of the brake system, parking brake system, both; a torque multiplication assembly that reduces a rotational speed from the motor and increases torque therefrom; or both. The gear train, including but not limited to differential assemblies, torque multiplication assemblies, or both, may include a total gear reduction of about 2:1 or more, about 3:1 or more, about 4:1 or more, about 5:1 or more, about 1.0:1 or more, about 15:1 or more, about 18:1 or more, about 19:1 or more, or about 20:1 or more. The gearing of the total brake system may include a total gear reduction of about 100:1 or less, 75:1 or less, about 50:1 or less, about 30:1 or less, about 25:1 or less, about 22:1 or less, or even about 20:1 or less. Preferably, the gear reduction is between about 5:1 and about 20:1. The gear train may directly or indirectly (e.g., via one or more linkages, levers, cables, assemblies, etc.) move the one or more brake shoes towards and/or away from the brake drum or the inner surface of the brake rotor to create and/or release the expansion force, the parking brake force, the parking brake apply, or a combination thereof.

The housing may function to contain therein at least some of the components of the actuator assembly. That is, the housing may at least partially contain therein a spindle, a nut gear, a key plate, a spring, an end plate, and/or a brake cable. The housing may be connected or secured to any support structure. For example, the housing may be connected to a knuckle of a vehicle or a back plate of a drum brake system. The housing may include a boot protecting at least a portion of the brake cable and the spindle. The housing may be made of a generally rigid material. The boot may be made of a generally flexible material. The housing may also include a housing plate, which may be located within an inner portion of the housing. The housing plate may secure one or more of the components of the actuator assembly within an inner portion thereof. The housing plate may maintain the position of and align one or more components of, the spindle assembly within the housing.

The spindle may function to move the brake cable to create and/or release the expansion force, the parking brake force, or both. The spindle may function to assist in transferring a rotational force or torque from the one or more motors into a linear force to move the brake cable in a parking brake apply direction, a parking brake release direction, or both. The spindle may function to push or pull the one or more cable stops to move the brake cable in a parking brake apply direction, a parking brake release direction, or both. The spindle may be any device that may perform one or more of the aforementioned functions. The spindle may have any shape. Preferably, the spindle is a generally cylindrical member that extends along a longitudinal axis, between a first end and a second end. The first end may be configured to move or push a first cable stop in the parking brake release direction so that the brake cable moves in the parking brake release direction. The second end may be configured to move or push an end plate against a second cable stop in the parking brake apply direction so that the brake cable moves in the parking brake apply direction. The spindle may be configured to move axially along its longitudinal axis. The spindle may be restricted from rotating about its longitudinal axis.

The spindle may include a threaded portion, a keyed portion, or both. The threaded portion may be disposed near the first end, and the keyed portion may be disposed near the second end, or vice versa. The threaded portion may be configured to threadably engage the nut gear. The keyed portion may be configured to engage a key plate. The keyed portion may include one or more features that may prevent the key plate from rotating about the longitudinal axis. That is, for example, the keyed portion may include one or more flats or machined portions, preferably two or more flats or machined portions, or even three or more, four or more or even five or more flats or machined portions that may function to engage a corresponding keyed portion on the key plate. The threaded portion may extend at least partially onto the keyed portion. For example, the threaded portion may extend onto the keyed portion approximately 2 mm or more, approximately 4 mm or more, preferably between about 6 mm and 8 mm, or even about 10 mm or more. The threaded portion may extend onto the keyed portion approximately 15 mm or less, approximately 12 mm or less, preferably between about 8 mm and 6 mm, or even between about 4 mm-2 mm or more. It may be desirable to extend the threaded portion at least partially onto the keyed portion because during release of the parking brake, at least a portion of the threaded, keyed portion may be engaged by the nut gear. More specifically, during release of the parking brake, when the spindle rotates and moves axially in the parking brake release direction, the key plate may contact the gear nut and remain in place. And, as the spindle continues to move in the parking brake release direction, the key plate may disengage from the end of the keyed portion of the spindle and the threaded, keyed portion may be engaged by the gear nut.

The threaded portion of the spindle may threadably engage a nut gear. The nut gear may function to axially and/or linearly move the spindle and, therefore, move the brake cable to create and/or release the expansion force, the parking brake force, or both. The nut gear may function to assist in transferring a rotational force or torque from the one or more motors, gear trains, or both into a linear force so that the spindle and the brake cable move axially and/or linearly. The nut gear may be connected to the spindle. That is, the nut gear may include an inner threaded portion that corresponds to the threaded portion of the spindle. Rotation of the nut gear in the first direction causes the spindle to move axially in the parking brake apply direction, and rotation of the nut gear in the second direction causes the spindle to move axially in a parking brake release direction, or vice versa. The nut gear may be connected to one or more motors, one or more gear trains, or both. That is, the nut gear may include one or more features for receiving as rotational force or torque from the one or more motors, gear train, or both. For example, the nut gear may include teeth engaging the one or more motors, gear trains, or both. The rotational force or torque may also be transferred from the one or more motors, gear trains, or both to the nut gear via a chain, belt, etc. The nut gear may be restricted from axially, linearly, or both moving while the spindle axially moves. That is, the nut gear may be axially secured to the housing, the housing plate, or both.

The keyed portion of the one or more spindles may engage a key plate. The key plate may function to restrict or prevent rotation of the spindle about its longitudinal axis. The key plate may function to assist in compressing the spring when the spindle is moved in the parking brake apply direction, the parking brake release direction, or both. The key plate may include corresponding features that engage the keyed portion of the spindle. For example, the key plate may include one or more flats or machined portions corresponding to the keyed portion of the spindle. The key plate may move axially along the longitudinal length of the spindle along the keyed portion of the spindle. The key plate may be restricted from moving onto the threaded portion of the spindle, the threaded, keyed portion of the spindle, or both. The key plate may include one or more arms. The one or more arms may engage at least a portion of the housing to restrict the key plate and the spindle from rotating.

The spring may be located between the key plate and an end plate. The spring may function to reduce an overall stiffness of the system. The spring may be any spring. Preferably, the spring is as compression spring. The compression spring may add "compliance" to the system. The spring's function may be to maintain a cable tension load as the parking brake deflects when subjected to the parking load (torque), which may happen after the motor has stopped. Without the spring, due to high stiffness, any deflection at the parking brake may cause a very large load drop at the brake shoes, which may cause the parking brake to fail and undesirably allow the vehicle to roll down a hill, for example. The spring may be compressed during application of the parking, brake, release of the parking brake, or both. Preferably, the spring is compressed during both the application and release of the parking brake. Preferably, the spring is compressed in a steady state or free running configuration (i.e., when the parking brake system is neither being applied not released). For example, the spring may be compressed in a steady state configuration on the order of approximately 10 N or more, approximately 15 N or more, approximately 100 N or more, approximately 200 N or more, approximately 400 N or more, or about 500 N or more. The spring may be compressed in a steady state on the order of approximately 1000 N or less, approximately 800 N or less, about 700 N or less (i.e., about 600 N). The spring may be compressed any suitable amount depending on vehicle application. That is, in some instances, it may be preferred for the compression to be on approximately 20 N, 100 N, or even 600 N. Further compression of the spring during application of the parking brake, release of the parking brake, or both may result in an increase in current draw by the power source. The increase in current draw may be monitored by a device (e.g., hardware, software, controller, etc.) indicating that the parking brake system is applied, released, or both. The increase in current draw may also signal that the actuator assembly, one or more brake shoes, or both have reached a home position after release of the parking brake apply, clamping force, or both. A home position may mean that the one or more brake shoes are out of engagement with the brake drum, and, accordingly, the brake drum and the vehicle is free to move.

A bearing may be located between the housing plate and the nut gear. The bearing may function to permit rotation of the nut gear relative to the housing plate. The bearing may support an axial load provided by the nut gear onto the housing plate during rotation of the nut gear. The bearing may be any bearing or any device that may function to perform one or more of the aforementioned functions. For example, the bearing may be a needle bearing, a thrust bearing, a ball bearing, a washer, a spacer, or a combination thereof.

The brake cable may function to move the one or more brake shoes to create or release the clamping force, the parking brake force, or both. The brake cable may be moved when the spindle is moved. That is, as the spindle is moved axially in the parking brake apply direction. The brake cable may be pulled, which, via the joint jaw, may move a parking brake lever in communication with one or more brake shoes so that the one or more brake shoes engage the inner surface of the brake drum, brake rotor, or both to create the parking brake force. Once the parking brake force is established, the brake cable may be in tension. Accordingly, moving the spindle in the parking brake release direction may reduce the tension in the brake cable, thereby allowing the parking brake lever to move so that the one or more brake shoes can disengage the inner surface of the brake drum, the brake rotor, or both and release the parking, brake force. The brake cable may include a connecting portion for engaging the parking brake lever, one or more brake shoes, the like, or a combination thereof. The connecting portion may be any feature that may engage the parking brake lever, one or more brake shoes, the like, or a combination thereof. For example, the connecting portion may be a joint jaw, a hook, a cable crimp, etc.

The brake cable may include one or more cable stops. The one or more cable stops may function to provide a region fur the brake cable to be moved, pushed, pulled, etc. by the spindle to apply or release the parking brake. The first cable stop may be pushed by a first end of the spindle during release of the parking brake system. The second cable stop may be pushed by an end plate during application of the parking brake system. The one or more cable stop may be any feature or device that may function to perform one or more of the aforementioned features. For example, the one or more cable stops may be connected to the brake cable such that the cable stops do not move, translate, rotate, etc, with respect to the cable. For example, the one or more cable stop may be an enlarged section of the brake cable, a flattened area, one or more crimps or features secured to the brake cable, etc.

FIG. 1 is a perspective view of the actuator assembly 100. The actuator assembly 100 includes a spindle assembly 102 that is in communication with a gear train 104 that receives power from a motor 106. At least some of the components of the actuator assembly 100 are contained within a housing 108. At least a portion of the housing 108 is secured to a support structure of a vehicle, such as a knuckle or back plate (not illustrated). A brake cable 138 extends from the housing 108 and is at least partially covered by a boot 110. A joint jaw 144 is located at an end of the brake cable 138 for connecting the brake cable 138 to a parking brake lever (not shown).

Figure 2A:
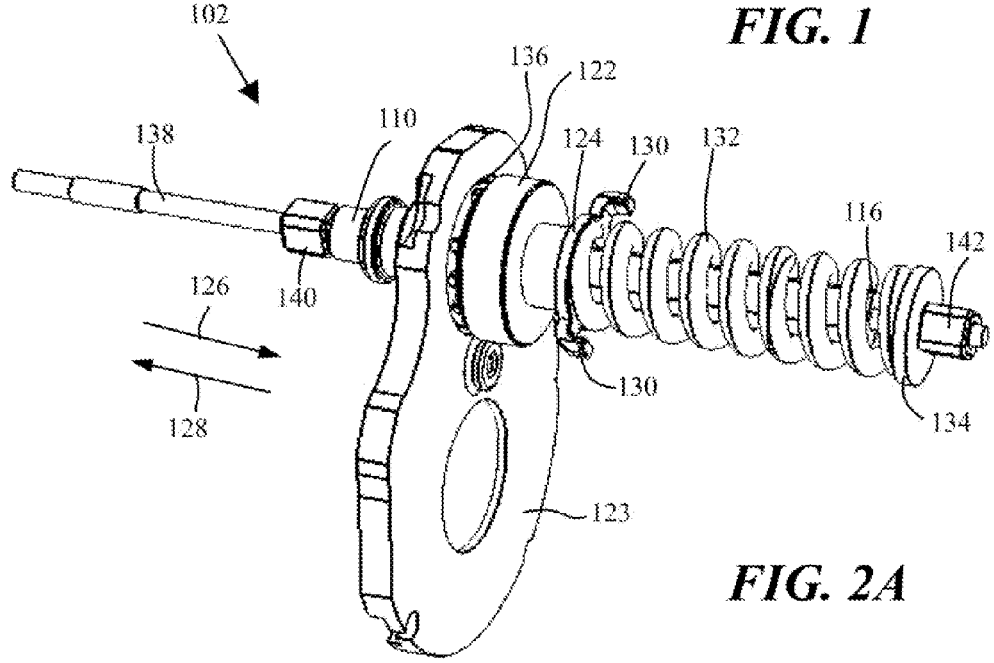
FIG. 2A illustrates a perspective view of the spindle assembly of the actuator assembly of FIG. 1 according to the teachings herein.
Figure 2B:
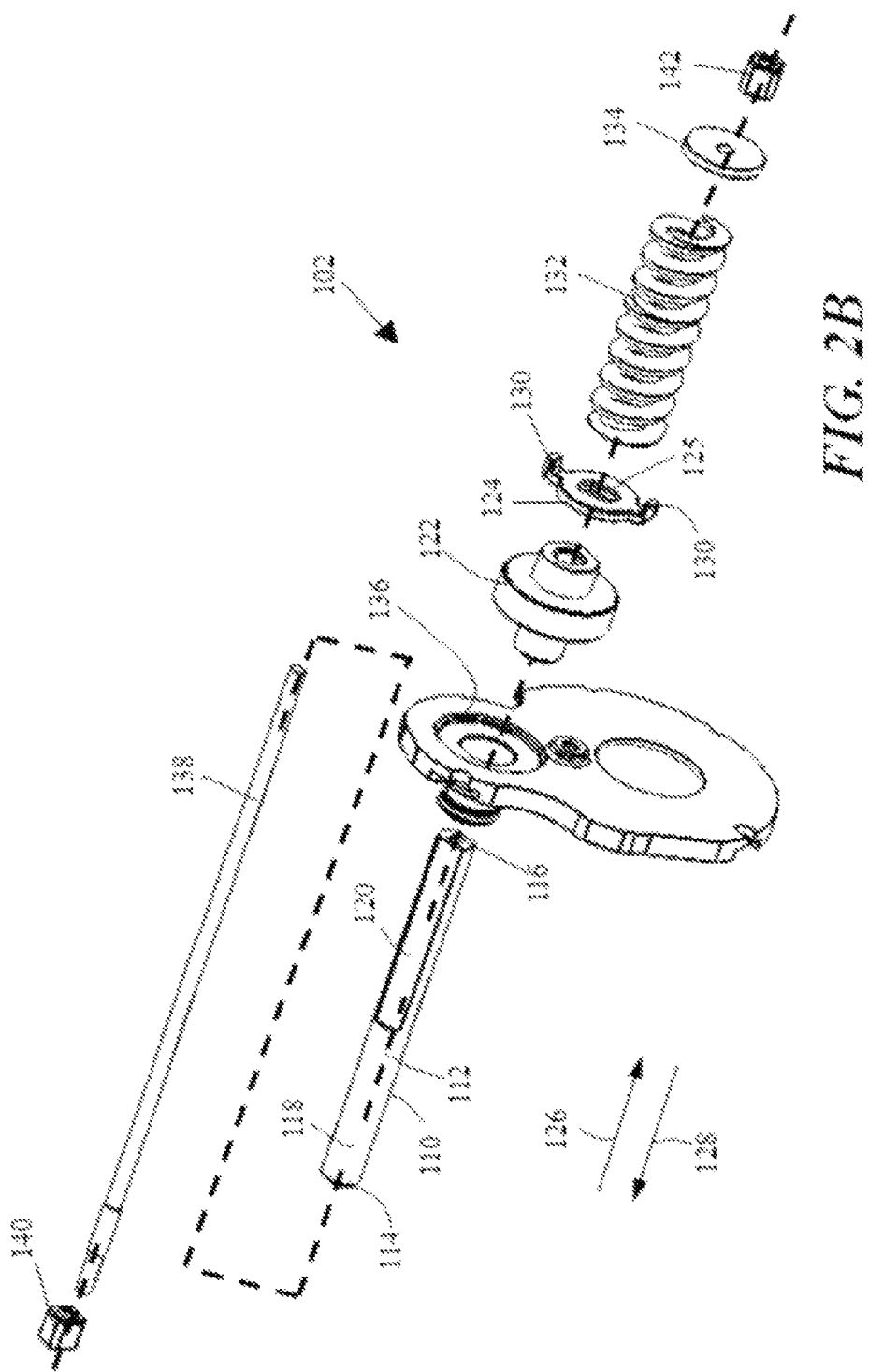
FIG. 2B illustrates an exploded, perspective view of the spindle assembly of the actuator assembly of FIGS. 1 and 2A according to the teachings herein.

FIG. 2A is a perspective view of the spindle assembly 102, and FIG. 2B is an exploded perspective view of the spindle assembly 102. With reference to both FIGS. 2A and 2B, the spindle assembly 102 includes a spindle 110 extending along a longitudinal axis 112 between a first end 114 and an opposing second end 116. The spindle 110 includes a threaded portion 118 and a keyed portion 120. The threaded portion 118 threadably engages a nut gear 122, and the keyed portion 120 engages as key plate 124. The nut gear 122 is in rotational communication with the motor 106 and/or the gear train 104. Rotation of the nut gear 122 in a first direction causes the spindle 110 to move axially in a first or parking brake apply direction 126, and rotation of the nut gear 122 in a second direction causes the spindle 110 to move axially in a second or parking brake release direction 128. The key plate 124 includes a keyed feature 125 that corresponds to the keyed portion 120 of the spindle 110. The key plate 124 slidably engages the keyed portion 120 and can move axially there along; however, the key plate 124 is restricted from sliding onto the threaded portion 118. The key plate 124 includes arms 130 engaging the housing 108 so that the key plate 124 and the spindle 110 are restricted from rotating about the longitudinal axis 112. A spring 132 is located between the key plate 124 and an end plate 134. A bearing 136 is located between the nut gear 122 and a housing plate 123. The housing plate 123 engages the housing 108 and supports the spindle assembly 102 therewithin. The spindle 110 is generally hollow so that the brake cable 138 can pass there through. The brake cable 138 has a first and a second cable stop 140, 142 attached thereto, and a joint jaw 144 (FIG. 1) for connecting the brake cable 138 to a parking brake lever that is in communication with the brake shoes (not illustrated).

With reference to FIGS. 1-2B, to create a parking brake apply (i.e., to create a clamping force, a parking brake force, or both), the motor 106, the gear train 104, or both provide a rotational force or torque to the nut gear 122 so that the nut gear 122 rotates in a first direction. Rotation of the nut gear 122 in the first direction causes the spindle 110 to move axially in a first or parking brake apply direction 126. As the spindle 110 moves in the first or parking brake apply direction 126, and a parking brake force is generated, a gap (not illustrated) may be formed between the first end 114 of the spindle 110 and the first cable stop 140. Because the key plate 124 is restricted from sliding onto the threaded portion 118, another gap (not illustrated) may be formed between the nut gear 122 and the key plate 124. Due to the load at the joint jaw 144, when the spindle 110 moves in the first or parking brake apply direction 126, at high parking brake force and thus high cable tension load, the brake cable 138 resists movement in the apply direction 126. Moreover, as the spindle 110 moves in the apply direction 126, the spring 132, which is trapped between the key plate 124 and the end plate 134, compresses therebetween. Accordingly, as the spindle 110 continues to move in the apply direction 126, while the brake cable 138 is prevented from moving, the second end 116 of the spindle 110 can engage the end plate 134 spring, which is prevented from moving by the cable stop 142, which is crimped on the cable 138. Moreover, while the spindle 110 moves in the first or parking brake apply direction 126, the key plate 124 can move or push the spring 132 against the end plate 134, which are both trapped between the key plate 130 and the cable stop 142. Accordingly, the spring 112 and the end plate 134 are together moved against the second cable stop 142, causing the second cable stop 142 to move in the first or parking brake apply direction 126 so that the brake cable 138 also moves in the first or parking brake apply direction 126. Accordingly, movement of the brake cable 138 in the first or parking brake apply direction 126 pulls the parking brake lever via the joint jaw 144, so that one or both of the brake shoes move and engage an inner surface of a brake drum, the brake rotor, or both. Accordingly, the expansion force, the parking brake force, or both is created. Moreover, movement of the spindle 110 in the first or parking brake apply direction 126 causes the key plate 124 to compress the spring 132 against the end plate 134, which may result in an increase in current draw from the motor 106. The increase in current draw may be realized and/or understood by a controller (not illustrated) that the parking brake system is being applied, has been applied (i.e., the clamping force has been created), or both.

To release the parking brake apply (i.e., to release the clamping force, the parking brake force, or both) the nut gear 122 is rotated in a second direction via the motor 106, the gear train 104, or both. Rotation of the nut gear 122 in the second direction causes the spindle 110 to move axially in the second or parking brake release direction 128. While moving in the second or parking brake release direction 128, the gap between the first cable stop 140 and the spindle first end 114 is eventually eliminated. Additionally, continued movement in second or parking brake release direction 128 causes any gap between the key plate 124 and the nut gear 122 to be reduced and ultimately eliminated (i.e., the key plate 124 will move and contact the nut gear 122). At the moment that the key plate 124 contacts the nut gear 122, the parking brake lever is no longer applying load on the parking brake shoes. As the spindle 110 continues to move in the second or parking brake release direction 128, the key plate 124 no longer moves in the second direction 128, and the first end 114 of the spindle 110 begins to push the first cable stop 140 in the second or parking brake release direction 128. Moreover, due to the key plate 124 being abutted against the nut gear 122, movement of the spindle 110 in the second or parking brake release direction 128 causes the second cable stop 142 to move or push the and plate 134 against the spring 132. Accordingly, the end plate 134 and the spring 132 are moved or pushed against the key plate 124 and abutted against the nut gear 122 thereby compressing the spring 132 therebetween. Compression of the spring 132 results in an increase in current draw from the motor 106. The increase in current draw may be realized and understood by the controller (not illustrated) that the parking brake has been released (i.e., the clamping force has been released) and that the brake shoes are in as home position.

Any numerical values recited herein include all values from the lower value to the upper value in increments of one unit provided that there is a separation of at least 2 units between any lower value and any higher value. As an example, if it is stated that the amount of a component or a value of as process variable such as, for example, temperature, pressure, time and the like is for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

LISTING OF REFERENCE NUMERALS 100 actuator assembly
102 spindle assembly
104 gear train
106 motor
108 housing
110 spindle
112 longitudinal axis (of spindle 110)
114 first end (of spindle 110)
116 second end (of spindle 110)
118 threaded portion (of spindle 110)
120 keyed portion of spindle 110)
122 nut gear
124 key plate
125 keyed feature (of key plate 124)
123 housing plate
126 first or parking brake apply direction
128 second or parking brake release direction
130 arms (of key plate 124)
132 spring
134 end plate
136 bearing
138 brake cable
140 first cable stop
142 second cable stop
144 joint jaw

What is claimed is:

1. An assembly, comprising:
   i. a spindle;
   ii. a brake cable in communication with the spindle; and
   iii. a spring in communication with the spindle,
   wherein movement of the spindle in a first direction causes the brake cable to move so that an expansion three is created, and movement of the spindle in a second direction causes the brake cable to move in a second direction so that the expansion three is released,
   wherein when the spindle is moved in the first direction, a key plate and an end plate are both moved in the first direction and together compress the spring therebetween, and when the spindle is moved in the second direction, the key plate and the end plate are both moved in the second direction and together compress the spring therebetween,
   wherein the key plate includes a keyed feature engaging a corresponding keyed portion on the spindle, and one or more arms engaging a housing so that the key plate and the spindle are restricted from rotating, and
   wherein movement of the spindle in both the first direction and the second direction causes the spring to compress so that a controller determines when the expansion force is created and/or released.

2. The assembly of claim 1, wherein the brake cable includes as first cable stop and a second cable stop, wherein:
   i. when the spindle is moved in the first direction, the spindle pushes the spring, which in turn pushes the end plate against the second cable stop so that the brake cable moves in the first direction, the key plate compresses the spring against the end plate as the expansion force is created, and
   ii. when the spindle is moved in the second direction, the spindle pushes the first cable stop so that the second cable stop pushes the end plate, the spring and the key plate against an axially fixed nut gear while the brake cable moves in the second direction, the spring is compressed between the end plate and the key plate as the expansion force is released.

3. The assembly of claim 2, wherein the nut near is connected to the spindle and in communication with a motor, wherein the motor communicates power to the nut gear and the nut gear transfers the power to the spindle so that the spindle moves axially in the first direction and in the second direction.

4. The assembly of claim 3, wherein the spindle includes a threaded portion threadably engaging the nut gear.

5. The assembly of claim 1. wherein the assembly is free of a position sensor for determining when the expansion force is created and released.

6. The assembly of claim 1, wherein the brake cable is in communication with a parking brake lever of a brake system, which comprises a brake drum or a brake rotor and one or more brake shoes,
wherein movement of the spindle in the first direction causes the brake cable to move in the first direction so that the one or more brake shoes are moved and engage the brake drum or a drum portion of the brake rotor to create the expansion force, and movement of the spindle in the second direction causes the brake cable to move in the second direction so that the one or more brake shoes move and disengage the brake drum or the drum portion of the brake rotor and release the expansion force.

7. An assembly, comprising:
i. a spindle;
ii. a motor in communication with the spindle, the motor causing the spindle to selectively move in a first direction or in a second direction;
iii. a brake cable in communication with the spindle; and
iv. a spring that is compressed in response to movement of the spindle, the spring is located between a key plate and an end plate,
wherein the spindle includes a threaded portion threadably engaging a gear nut, the spindle includes a keyed portion engaging the key plate,
wherein the spindle is generally cylindrical and the keyed portion includes at least one flat section,
wherein the key plate is restricted from moving onto the threaded portion of the spindle,
wherein movement of the spindle in the first direction causes the brake cable to move in the first direction so that a parking brake force is created, and movement of the spindle in the second direction causes the brake cable to move in the second direction so that the parking brake force is released,
wherein when the spindle is moved in the first direction, the key plate and the end plate are both moved in the first direction which then together compress the spring therebetween, and when the spindle is moved in the second direction, the key plate and the end plate are both moved in the second direction, which then together compress the spring therebetween, and
wherein a controller determines when the parking brake three is created and released by compression of the spring.

8. The assembly of claim 7, wherein the assembly does not include a position sensor to determine when the parking brake force is created and released.

9. The assembly of claim 7, wherein the brake cable includes a first cable stop and a second cable stop, wherein
i. when the spindle is moved. in the first direction, the key plate pushes the spring and the end plate in the first direction against the second cable stop so that the brake cable moves in the first direction, the spring is compressed between the key plate and the end plate as the parking brake force is created and
ii. when the spindle is moved in the second direction, and the key plate is abutted against an axially fixed nut gear, the spindle pushes the first cable stop thereby causing the second cable stop to push the end plate, the spring and the key plate against the nut gear while the brake cable moves in the second direction, the spring is compressed between the end plate and the key plate to ensure that the parking brake force is released fully.

10. The assembly of claim 9. wherein the brake cable is in communication with a parking brake lever of a brake system, which comprises a brake drum or a brake rotor and one or more brake shoes,
wherein movement of the spindle in the first direction causes the brake cable to move in the first direction so that the one or more brake shoes are moved and engage the brake drum or a drum portion of the brake rotor to create the parking brake force, and movement of the spindle in the second direction causes the brake cable to move in the second direction so that the one or more brake shoes move and disengage the brake drum or the drum portion of the brake rotor and release the parking brake force.

11. The assembly of claim 7, wherein the key plate includes at least one arm engaging a housing to prevent rotation of the spindle about its longitudinal axis.

12. The assembly of claim 7, wherein the motor is an electric motor.

13. The assembly of claim 12, wherein a gear train is located between the electric motor and a nut gear, the gear train translates, increases, or decreases a rotational speed or torque supplied by the motor to the nut gear to axially move the spindle in the first direction and the second direction.

14. An actuator assembly for a drum brake system or a drum in hat brake system, comprising:
i. a spindle;
ii. a motor in communication with the spindle causing the spindle to selectively axially move in a first direction and in a second direction;
iii. a brake cable connected the spindle, the brake cable includes a first cable stop and a second cable stop; and
iv. a spring that is compressed between a key plate and an end plate in response to movement of the spindle,
wherein when the spindle is moved in the first direction, the spindle pushes the spring which, in turn pushes the end plate against the second cable stop so that the brake cable moves in the first direction, the key plate compresses the spring against the end plate as a clamping force is created, and/or when the spindle is moved in the second direction, the spindle pushes the first cable stop thereby causing the second cable stop to push the end plate, the spring and the key plate against a nut gear while the brake cable moves in the second direction, the spring is compressed between the end plate and the key plate as the clamping force is released,
wherein a controller determines when the clamping force is created and released by compression of the spring, and
wherein the actuator assembly does not include a position sensor to determine when the clamping force is created and released.

15. The actuator assembly of claim 14, wherein the brake cable is in communication with a parking brake lever of the drum brake system or the drum in hat brake system each of which comprise a brake drum and one or more brake shoes,
wherein movement of the spindle in the first direction causes the brake cable to move in the first direction so that the one or more brake shoes are moved and engage the brake drum to create the clamping force, and movement of the spindle in the second direction causes the brake cable to move in the second direction so that the one or more brake shoes move and disengage the brake drum and release the clamping force.

16. The actuator assembly of claim 15, wherein the key plate includes a keyed feature engaging a corresponding keyed portion on the spindle, the key plate includes one or more arms engaging a housing to prevent rotation of the spindle about its longitudinal axis.

17. The actuator assembly of claim 14, wherein the nut gear is connected to the spindle and in communication with the motor,
- wherein the motor communicates power to the nut gear and the nut gear transfers the power to the spindle so that the spindle moves axially in the first direction and in the second direction, and
- wherein the nut gear is restricted from axially moving while the spindle axially moves in both the first direction and the second direction.

\* \* \* \* \*

UNITED STATES PATENT AND TRADEMARK OFFICE
CERTIFICATE OF CORRECTION

PATENT NO. : 9,592,813 B2  
APPLICATION NO. : 14/750488  
DATED : March 14, 2017  
INVENTOR(S) : Galus Chelaidite Page 1 of 1

It is certified that error appears in the above-identified patent and that said Letters Patent is hereby corrected as shown below:

In the Claims

Column 12, Claim 1, Line 27, should read "force is created," instead of "three is created,"

Column 12, Claim 1, Line 29, should read "force is created," instead of "three is released,"

Column 12, Claim 2, Line 46, should read "includes a first" instead of "includes as first"

Column 13, Claim 7, Line 49, should read "force is created" instead of "three is created"

Signed and Sealed this  
Sixteenth Day of May, 2017

Michelle K. Lee  
*Director of the United States Patent and Trademark Office*